United States Patent [19]

Okamura et al.

[11] 4,420,128

[45] Dec. 13, 1983

[54] MAGNETIC TAPE CASSETTE

[75] Inventors: Masatoshi Okamura; Haruo Shiba, both of Tokyo, Japan

[73] Assignee: TDK Electronics Co., Ltd., Tokyo, Japan

[21] Appl. No.: 323,536

[22] Filed: Nov. 20, 1981

[30] Foreign Application Priority Data

Feb. 12, 1981 [JP] Japan ............................... 56-19036[U]

[51] Int. Cl.³ .......................... G03B 1/04; G11B 15/32
[52] U.S. Cl. .................................... 242/199; 242/71.8
[58] Field of Search ....................... 242/71.8, 71.9, 74, 242/197, 199, 200; 360/93, 94, 132

[56] References Cited

U.S. PATENT DOCUMENTS 3,686,470 8/1972 Stahlberg et al. ................ 242/74 X
4,226,382 10/1980 Watanabe .............................. 242/74

*Primary Examiner*—Leonard D. Christian
*Attorney, Agent, or Firm*—Oblon, Fisher, Spivak, McClelland & Maier

[57] ABSTRACT

A magnetic tape cassette comprising a magnetic tape and two reels for winding said magnetic tape in the casing assembly has a through hole for determining the clamping position formed in the position corresponding to one of reel driving ribs for one reel and another through hole formed in the position between the adjacent ribs for the other reel.

2 Claims, 9 Drawing Figures

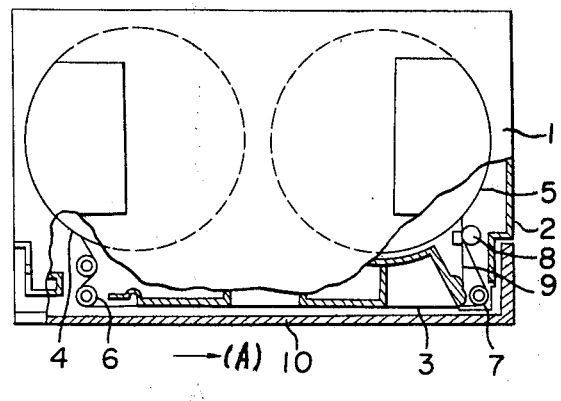
FIG. 1 PRIOR ART
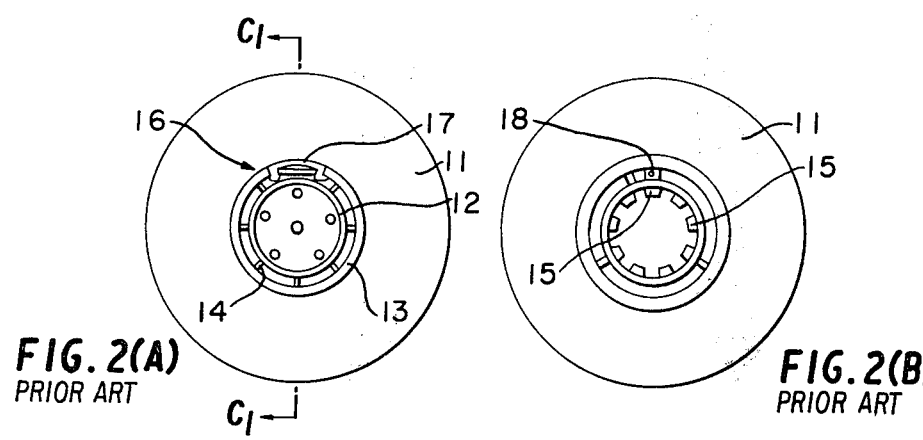
FIG. 2(A) PRIOR ART
FIG. 2(B) PRIOR ART
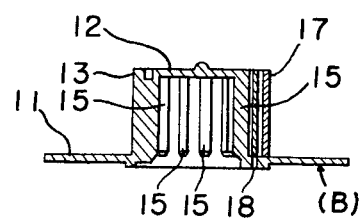
FIG. 2(C) PRIOR ART

MAGNETIC TAPE CASSETTE

BACKGROUND OF THE INVENTION

1. Field of the Invention

The present invention relates to a magnetic tape cassette used in a video tape recorder (hereinafter, referred to as VTR).

2. Description of the Prior Art

The conventional magnetic tape cassettes used in the VTR are classified into two types: the VHS system and the beta system. In either system, a casing assembly is fabricated so as to hold a magnetic tape, a pair of feeding and winding reels on which the magnetic tape is wound. FIG. 1 illustrates the conventional magnetic tape cassette for the VHS system. A magnetic tape (3) and a pair of feeding and winding reels (4), (5) for winding the magnetic tape (3) are held in a casing assembly comprising an upper half casing (1) and a lower half casing (2). Tape guides (6), (7) and (8) for guiding the magnetic tape (3) and a tape pade (9) are provided between the feeding reel (4) and the winding reel (5) in the running passage for the magnetic tape (3) in front of the casing assembly so that the magnetic tape (3) runs from the feeding reel side to the winding reel side along the arrow direction (A) while the magnetic tape is sequentially brought into contact with these parts (6) to (9). A guard panel (10) is pivotally supported in the front of the casing assembly so as to cover the magnetic tape (3).

As shown in FIGS. 2(A) to 2(C), the feeding reel (4) and the winding reel (5) respectively comprises a circular reel hub (11), a cylindrical axial part (12) to which the driving shaft of the VTR (not shown) is connected, a cylindrical magnetic-tape winding core (13) having a larger diameter than the axial part (12), said axial part (12) and said winding core being formed in coaxial with the circular reel hub (11), and reinforcing ribs (14) which radially extend between the axial part (12) and the magnetic-tape winding core (13) to connect them.

A plurality of reel driving ribs (15) with which the driving shaft of the VTR engages are formed with a suitable spacing on the surface of the inner diameter of the axial part (12). A recessed portion (16) is formed at a part of the outer periphery of the magnetic-tape winding core (13) so that the end portion of the magnetic tape (3) is clamped by the recessed portion and a fitting element (17) which is inserted into the recessed portion (16). A through hole (18) communicating with the reel driving side (B) of the core is formed in the position corresponding to the end portion of the fitting element (17) whereby the fitting element (17) can be forcibly removed from the recessed portion (16) by inserting a jig (19) into the through hole (18) from the opening of the reel driving side of the core as shown in FIG. 3. The through hole (18) is formed at the center of the recessed portion (16) and the position of the hole (18) coincides with that of one of the reel driving ribs (15).

The feeding reel (4) and the winding reel (5) have exactly the same structure as described above. It is, therefore, unnecessary to distinguish both the reels from each other in the assembling operation. However, when it is necessary to separate the thickness of the feeding reel (4) from that of the winding reel (5), and hence distinguishing of the feeding reel (4) from the winding reel (5) is required, it is difficult to distinguish the feeding reel (4) from the winding reel (5) because the other dimensions are completely the same thereby causing erroneous assembling operations.

It can be considered to distingush the reels (4) and (5) by changing the structure and the shape of the reels (4), (5). However, it is not practically applicable because they have different configurations whereby it is not easy to detect the difference and further functional problems may result by the change of design.

SUMMARY OF THE INVENTION

It is an object of the present invention to provide a magnetic tape cassette which does not substantially cause a difference in appearance on reels even though the distinguishing of a feeding reel from a winding reel is required and which permits easily and certainly distinguishing both the reels while assuring the same function as the conventional tape cassette.

The foregoing and the other objects of the present invention have been attained by providing a magnetic tape cassette for holding a magnetic tape and two reels for winding the magnetic tape in which the position of a reel driving rib in relation to the tape clamping position for one reel is different from that for the other reel.

BRIEF DESCRIPTION OF DRAWINGS

FIG. 1 is a front view, partly sectioned of a typical magnetic tape cassette for the VHS system;

FIG. 2(A) is a plane view of the feeding reel or the winding reel used in the conventional magnetic tape cassette;

FIG. 2(B) is a rear view of the reel shown in FIG. 2(A);

FIG. 2(C) is a sectional view taken along the line $C_1$-$C_1$ of FIG. 2(A);

DETAILED DESCRIPTION OF THE PREFERRED EMBODIMENT

Certain embodiments of the present invention will be described with reference to drawings.

Figure 3:
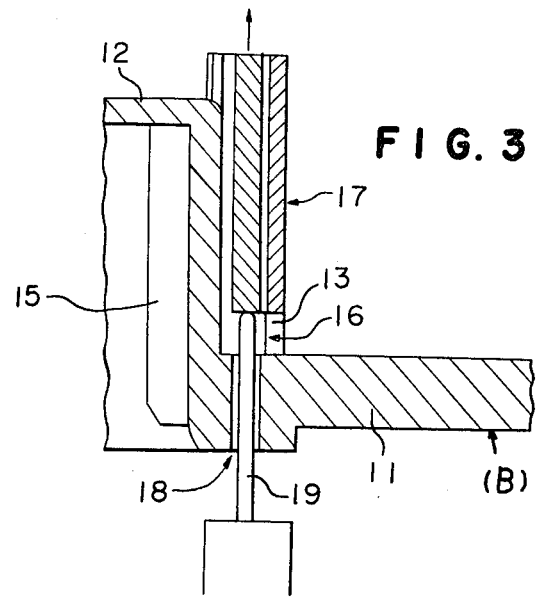
FIG. 3 is a fragmentally sectional view showing the operation of the conventional tape cassette.
Figure 4A:
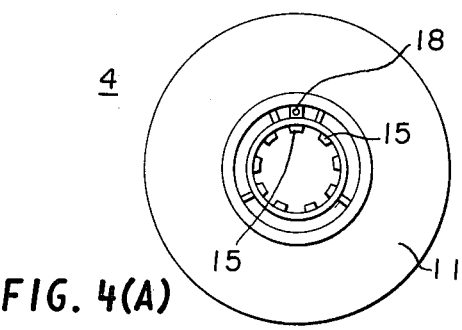
FIG. 4(A) is a rear view of an embodiment of the feeding reel used in the VHS magnetic tape cassette of the present invention.
Figure 4B:
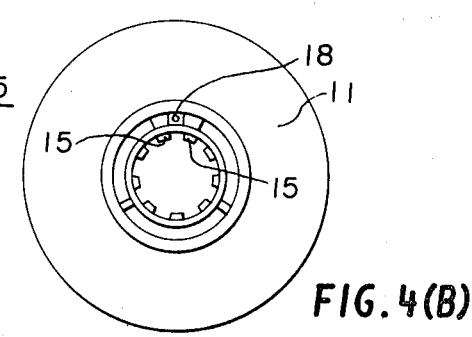
FIG. 4(B) is a rear view of an embodiment of the winding reel of the present invention.

FIGS. 4(A) and 4(B) respectively illustrate the rear sides of a feeding reel and a winding reel which are held in a VHS magnetic tape cassette. In the feeding reel (4) shown in FIG. 4(A), a through hole (18) for determining the clamping position is formed in the position corresponding to one of the reel driving ribs (15) as in the conventional feeding reel, whereas in the winding reel shown in FIG. 4(B), the through hole (18) is not formed in the position corresponding to reel driving ribs (15) but between the adjacent ribs (15), (15). The structure of the feeding reel (4) is completely the same as that of the winding reel (5) except for the position of the through hole.

With the structure described above, the feeding reel (4) can be easily and purely distinguished from the winding reel (5) in view a difference of the position of the through hole for determining the clamping position from that of the reel driving rib. The configuration of both the reels are the same whereby no functional problem occurs.

Figure 5A:
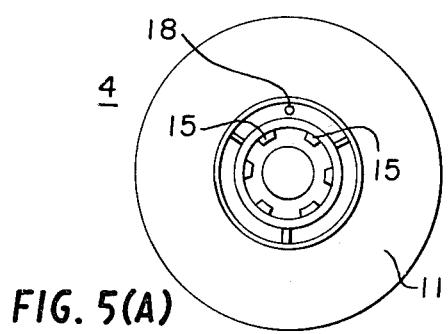
FIG. 5(A) is a rear view of an embodiment of the feeding reel used in the beta-max magnetic tape cassette.
Figure 5B:
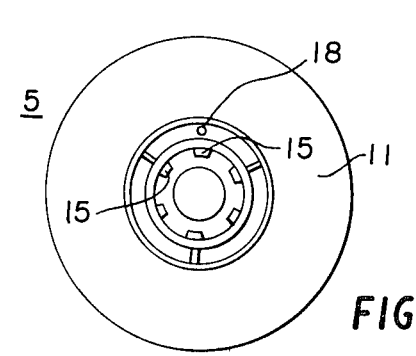
FIG. 5(B) is a rear view of an embodiment of the winding reel of the present invention.

FIGS. 5(A) and 5(B) respectively illustrate the rear sides of a feeding reel (4) and a winding reel (5) which are held in the beta type magnetic tape cassette. In the feeding reel (4) shown in FIG. 5(A), a through hole (18) is formed in the middle of the adjacent reel driving ribs (15), (15) as in the conventional feeding reel, whereas, in the winding reel shown in FIG. 5(B), the through hole (18) is formed in the position corresponding to one of the reel driving rib (15).

In the embodiment shown in FIGS. 5(A) and 5(B), the same function as in FIGS. 4(A) and 4(B) can be obtained.

The feeding reel (4) and the winding reel (5) shown in FIGS. 4(A) and 4(B) can be replaced by those in FIGS. 5(A) and 5(B).

As described above, in a magnetic tape cassette of the present invention which holds a magnetic tape and two reels for winding the magnetic tape in a casing assembly, the position of a reel driving rib in relation to the tape clamping position for one reel is different from that for the other reel. Therefore, it is easy for an operator to distinguish the feeding reel from the winding reel in the assembling operation without causing a difference in appearance between them even though both the reels are required to be distinguished. No functional problem will occur.

We claim:

1. A magnetic tape cassette, comprising:
a casing;
a tape feeding reel in said casing, said tape feeding reel including a first reel hub having first annular winding core including a first recessed portion for insertion of a first fitting element, said first winding core including a circumferentially spaced plurality of driving ribs mounted thereon, said tape feeding reel further including a first through hole in said first reel hub at a position corresponding to said first recessed portion;
a tape winding reel in said casing, said tape winding reel including a second reel hub having a second annular winding core including a second recessed portion for insertion of a second fitting element, said second winding core including a circumferentially spaced plurality of driving ribs mounted thereon, said tape winding reel further including a second through hole in said second reel hub at a position corresponding to said second recessed portion; and
a tape wound between said reels and clamped thereto at said recessed portions by said fitting elements,
wherein one of said first and second through holes is mounted at a circumferential angular position corresponding to one of said driving ribs on a respective one of said first and second winding cores, and wherein the other of said first and second through holes is mounted at a circumferential angular position corresponding to a circumferential space between two of said driving ribs on a respective other of said first and second winding cores, whereby said tape feeding reel and said tape winding reel can be distinguished from one another.

2. A magnetic tape cassette according to claim 1, wherein the shape and the structure of said tape feeding reel is the same as those of said tape winding reel except for the position of said through holes.

* * * * *